United States Patent [19]
Duerst

[11] 3,771,808
[45] Nov. 13, 1973

[54] PORTABLE CARCASS SKID

[76] Inventor: Henry Duerst, 4813A N. 66th St., Milwaukee, Wis. 53218

[22] Filed: July 12, 1971

[21] Appl. No.: 161,642

Related U.S. Application Data

[63] Continuation-in-part of Ser. No. 859,958, Sept. 22, 1969, abandoned.

[52] U.S. Cl. ............................................... 280/19
[51] Int. Cl. ........................................... B62b 15/00
[58] Field of Search .................... 280/12 R, 18, 19; 224/7 R, 7 A, 7 B

[56] References Cited
UNITED STATES PATENTS

| | | | |
|---|---|---|---|
| 3,432,181 | 3/1969 | McKee | 280/18 |
| 3,355,187 | 11/1969 | Brindle | 280/18 |
| 3,140,878 | 7/1964 | Davis | 280/18 |

FOREIGN PATENTS OR APPLICATIONS

| | | | |
|---|---|---|---|
| 118,596 | 4/1947 | Switzerland | 280/19 |

Primary Examiner—Robert R. Song
Attorney—Wheeler, House & Wheeler

[57] ABSTRACT

A portable skid for hauling game from the field which comprises a rectangular sheet of plastic having a high tear strength and provided with reinforced apertures along the side margins and forward margin. When not in use, the skid is rolled in a coil and carried on the shoulder by a sling. When in use, the game carcass is placed on the unrolled skid and cords tied between the reinforced apertures on the side margins to form an upwardly open U-shaped channel around the carcass with the narrow bottom web interconnecting the channel side walls functioning as a runner. A rope secured to reinforced apertures in the forward margin is used to drag the skid. In one embodiment of the invention, spaced bands having a stiff pile or fiber surface on the upper surface of a plastic sheet prevent the carcass from sliding off the skid.

2 Claims, 9 Drawing Figures

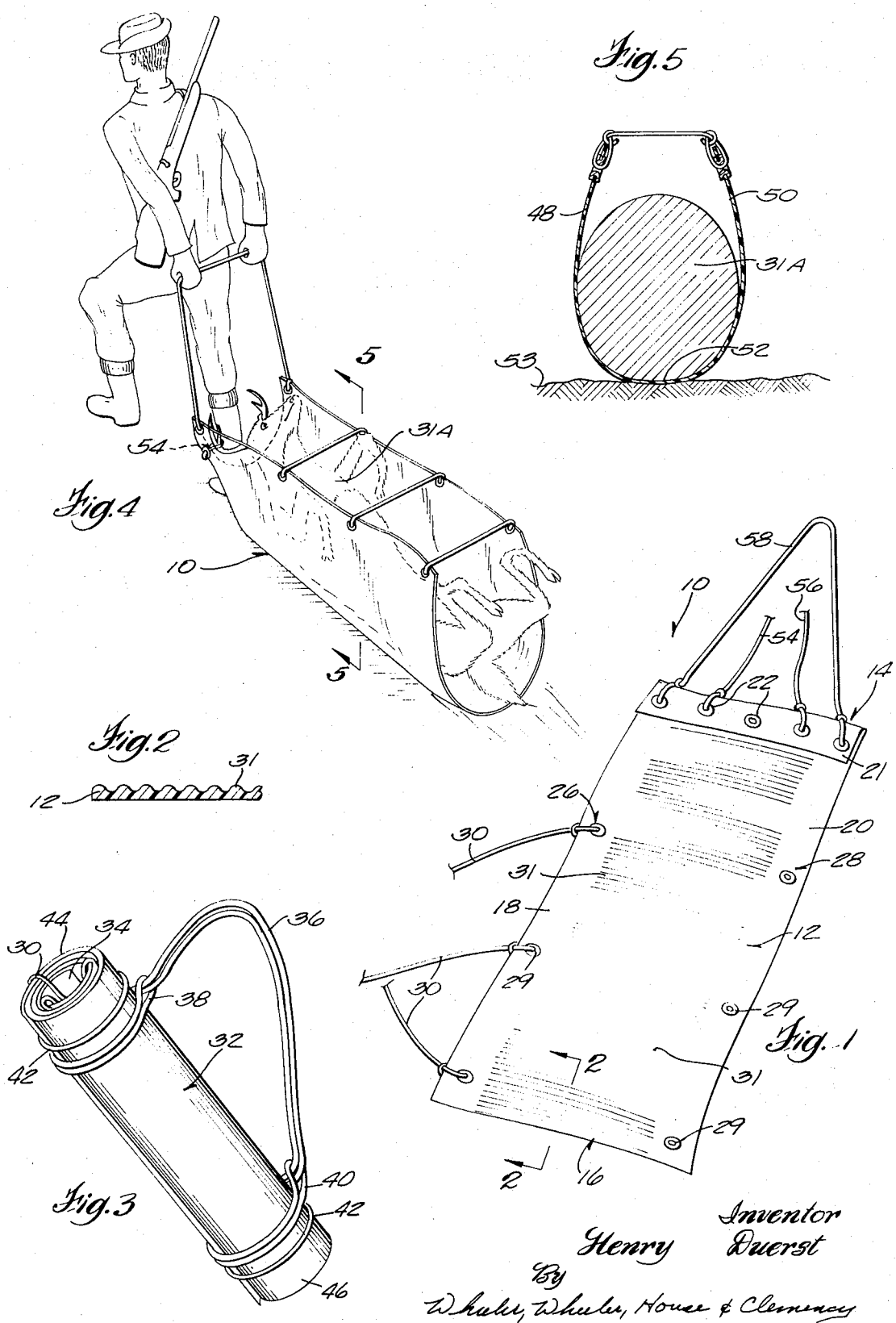

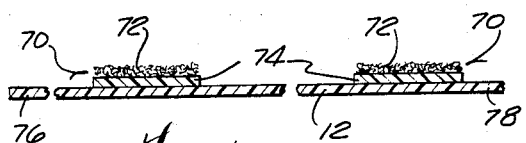
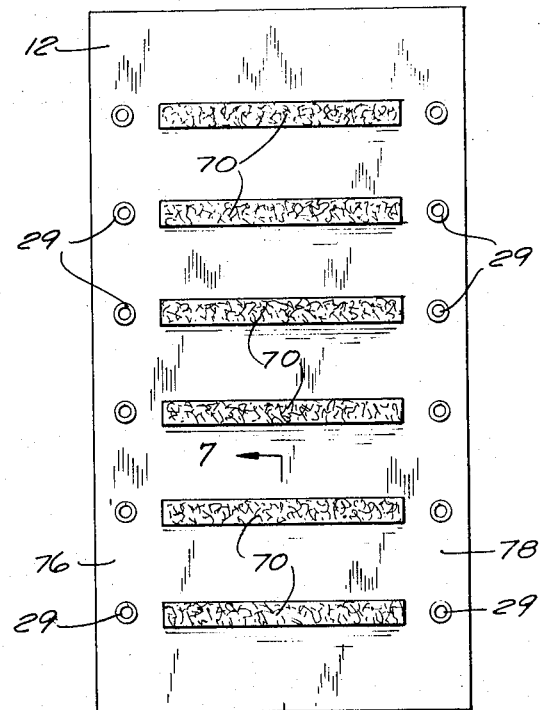
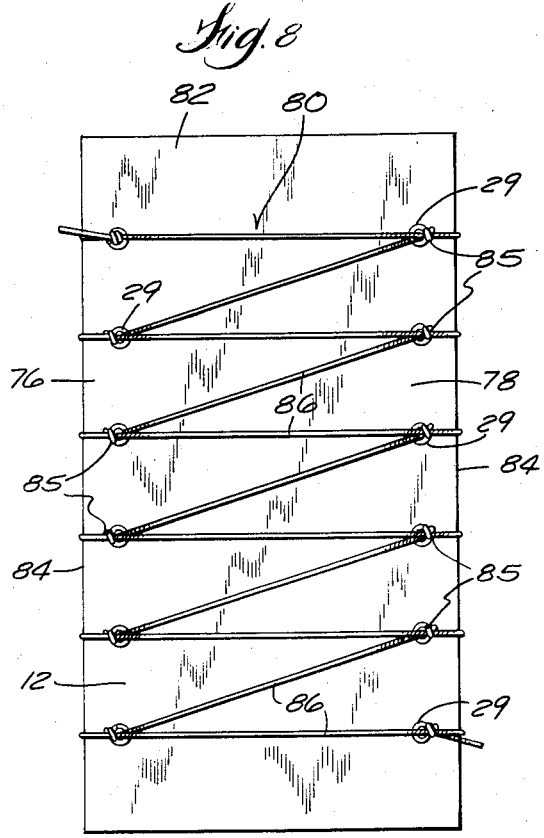
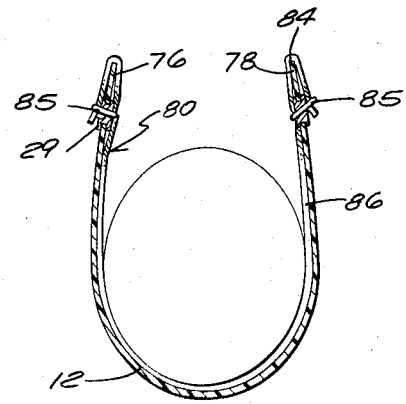

PORTABLE CARCASS SKID

CROSS REFERENCES TO RELATED APPLICATION

The present application is a continuation-in-part of my co-pending application Ser. No. 859,958 filed Sept. 22, 1969 now abandoned.

BACKGROUND OF INVENTION

The invention relates to devices for transporting game carcasses from the field to the hunter's camp or to a road, and more particularly to a skid for dragging animal carcasses along the ground. The removal of big game, such as deer, bear, antelope, elk, moose, etc. from a field is a strenuous task because of the weight of the game and the sometimes rough terrain over which the carcass must be transported. Dragging the carcass damages the hide, rendering the hide unfit for garments, gloves, purses, etc. Various wheeled vehicles have been devised for the transporting of carcasses. However, these vehicles are large and cumbersome and cannot be conveniently carried on the hunter's back, and thus are generally left at the camp until the need for the vehicle arises. The successful hunter must return to the camp to get the vehicle and then return to the field to locate and remove the carcass.

SUMMARY OF INVENTION

The invention provides a lightweight, portable carcass hauling device or skid which can be carried on the shoulder of the hunter while hunting. A rectangular sheet of heavy gauge flexible plastic with a high tear strength such as a polyethylene terephthalate is provided with reinforced apertures, such as brass grommets along the side margins. The forward or leading edge of the rectangular sheet is reinforced with a fold, formed by an over-turned flap secured by a plurality of grommets. When not in use, the rectangular sheet is rolled in a tight cylindrical roll or coil and carried by a sling.

When in use, the sheet of plastic is unrolled and placed under the carcass with the carcass oriented along the longitudinal center line of the sheet. The sides of the sheet are wrapped around the carcass to form an upwardly open generally U-shaped open ended channel by a series of ties or ropes interconnected between the adjacently located reinforced apertures on the opposed side margins. The side walls of the channel rigidify the bottom web which interconnects the channel side walls to make the web function as a smooth, stiff narrow runner which is easily pulled over uneven ground with a minimum of friction and drag. The rigidity afforded by th side walls makes the runner substantially non-deformable in use. The antlers, horns or head of the animal can be tied to some of the reinforced apertures in the forward margin. A sling or rope connected to some of the reinforced apertures in the forward margin enables the hunter to drag the skid along the ground. The skid can also be pulled by a trail bike, snowmobile, etc.

In one embodiment of the invention, the upper surface of the sheet is provided with a friction surface in the form of a series of parallel and transversely extending corrugations or ribs which prevent the carcass from sliding rearwardly from the channel. The ribs also add rigidity to the skid. In other embodiments the ribs are in the form of bands having a stiff pile or fibrous surface. In a further embodiment a rope laced diagonally between the grommets and laying on the upper surface of the skid provides a friction surface.

It is an object of the invention to provide a portable device for skidding an animal carcass from the field.

It is a further object of the invention to provide a lightweight game hauling device in the form of a rectangular sheet of plastic which is rolled into a tight cylinder when not in use and carried by a sling from the hunter's shoulder, and in which the sheet of plastic is convertd into an envelope or a generally U-shaped open ended channel enclosing the carcass for skidding the carcass along the ground.

Further objects and advantages of the present invention will become apparent from the following disclosure.

DRAWINGS

FIG. 1 is a perspective view of a carcass skid in accordance with the invention.

FIG. 2 is a sectional view along line 2—2 of FIG. 1.

FIG. 3 is a perspective view of the device shown in FIG. 1 coiled in a cylinder for carrying.

FIG. 4 is a perspective view of a game hauling device of the invention shown in use.

FIG. 5 is a sectional view along line 5—5 of FIG. 4.

FIG. 6 is a plan view of a modified embodiment of the invention.

FIG. 7 is a sectional view along line 7—7 of FIG. 6.

FIG. 8 is a plan view of a modified embodiment of the invention.

FIG. 9 is an end view of the embodiment of FIG. 8 in use.

DETAILED DESCRIPTION

Although the disclosure hereof is detailed and exact to enable those skilled in the art to practice the invention, the physical embodiments herein disclosed merely exemplify the invention which may be embodied in other specific structures. The scope of the invention is defined in the claims appended hereto.

In the drawings, FIG. 1 shows a game hauling device or skid in accordance with the invention which is generally designated 10 and which includes a rectangulr or elongated sheet 12 of plastic. The plastic sheet 12 is desirably formed from heavy gauge (Mylar) polyethylene terephthalate. Mylar retains its flexibility and strength in a temperature range between 80 degrees below zero and 280 degrees Fahrenheit, and thus is useable under all climatic conditions. A sheet of 14 gauge Mylar, the heaviest gauge presently commercially available, was successfully tested.

The sheet has a forward margin 14, a rear margin 16, and side margins respectively 18 and 20. The forward margin 14 is reinforced by an overturned flap 21 secured by a plurality of grommets 22. The side margins 18 and 20 are each provided with a plurality of longitudinally aligned equally spaced reinforced apertures which can be in the form of rows 26 and 28 of grommets 29.

In one embodiment of the invention, the sheet 12 is provided with a friction surface in the form of a series of parallel, transversely extending ribs or corrugations 31 on the upper surface of the sheet 12 between rib-free margins to prevent rearward slippage of the carcass 31A. The corrugations 31 can be molded integrally with the sheet or formed separately and glued or otherwise secured to the sheet 12. The ribs 31 also increase the strength and durability of the sheet 12.

The side margin 18 can be provided with short ties or ropes 30, each tie being permanently fastened by a knot to the apertures 29 in row 26.

When the skid 10 is not in use the sheet 12 is rolled into a tight cylindrical roll or coil 32 as best shown in FIG. 3 with the ties depending downwardly in the interior 34 of the coil. The roll 32 is conveniently carried by the hunter in the field using a sling 36 which has slip loops 38 and 40 around the roll 32. The slip loops are maintained in the desired position on the roll by two or more elastic bands 42 located between the slip loops 38 and 40 and the ends 44 and 46 of the roll 32. The bands 42 also maintain the sheet 12 in a tight coil.

When the skid 10 is to be used to haul the carcass of an animal, the sheet 12 is unrolled and the carcass is placed on the upper surface of the sheet with the top of the back of the carcass oriented along the longitudinal center line of the sheet 12 as shown in FIG. 4. The ties 30 are then secured by knots to the adjacently located apertures 29 on the opposite side margin 18 to form a generally U-shaped open ended channel as shown in FIG. 5. The side walls 48 and 50 of the channel rigidify the interconnecting web portion 52 to make the web portion 52 into a smooth non-deformable runner with a minimum of contact area on the ground 53 to thus decrease the friction and drag. The antlers, horns or head of the carcass can be secured to the forward margin by ties 54 and 56 to prevent rearward slippage of the carcass. The sling 36 or another rope 58 can be fastened to other of the grommets 22 in the forward margin 14 to facilitate dragging the skid 10. The sling 36 can also be used to carry the hunter's rifle.

A practical embodiment of the skid 10 includes a rectangular sheet 12 having a width of 32 inches and a length of 72 inches. This width will afford sufficiently high side walls 48 and 50 to enclose the carcass of a deer. A larger sheet would be deisrable for larger game, such as moose or elk.

When the skid 10 is flat, it is analogous to a simple beam. When the sides are formed to provide the U-shaped channel, it is believed that the moment of inertia about the center of gravity is changed. Thus the deflection or displacement of the skid 10 is minimized. This phenomenum would be true with other sheet materials to a certain extent. However, with sheet materials such as plywood, the maximum elastic strain would be exceeded in attempting to roll the plywood into a coil for carrying.

FIG. 6 shows a modified embodiment of the invention in which the sheet 12 is provided with transverse spaced flexible bands 70 which are glued, laminated or otherwise secured to the sheet 12 to prevent rearward slippage of the carcass. The bands 70 can be in the form of bond fabric strips which have a stiff fiber 72 or filament mat or pile on a backing 74. The pile can be nylon or plastic. Velcro fastening strips can also be employed. The bands 70 can be located between band free margins 76, 78 which are provided with grommets or reinforced apertures 29.

FIG. 8 discloses a further embodiment of the invention in which the friction surface is in the form of a length of rope 80 which is laced between the grommets 29 on the upper surface 82 of the skid. The rope 80 can be looped around the side edges 84 of the sheet 12 and around the margins 76, 78 and suitably knotted by knots 85 to secure the individual rope runs 86 in place. With each rope run 86 secured between two grommets, rearward tension on the runs 86 caused by inertia and rearward slippage of the carcass causes the margins 76, 78 to be drawn upwardly and about the carcass to firmly grip the carcass. With this embodiment the ties 30 are not required to firmly retain the carcass. However, the grommets 29 are desireably of a sufficient diameter so that ties 30 can be employed and fastened to the same grommets if desired.

Although the skids disclosed are described for use in hauling game, they can also be used for hauling other loads, and a snow vehicle could be employed to pull the skid.

What is claimed is:

1. A skid for hauling a load from the field comprising an elongated sheet of plastic having an upper surface and a high tear strength and formable into a channel, said sheet having side margins and a forward margin with a plurality of reinforced apertures in said margins, tie means extending through oppositely located ones of said apertures in said side margins for maintaining said sheet in said channel shape, a handle means for pulling said skid connected to said apertures in said forward margin, said channel being defined by side walls of said sheet, and a web portion of said sheet, said web portion interconnecting said side walls and being rigidified by said side walls to form a stiff skid bottom and means for retaining the load against rearward slippage from said sheet said means for retaining the load comprising a plurality of longitudinally spaced transverse bands located intermediate said side margins and glued to said upper surface of said sheet, said bands having a friction surface.

2. A skid in accordance with claim 1 wherein said friction surface on said bands comprises a mat of stiff fibers.

* * * * *